US 6,654,130 B2

(12) United States Patent
Berger et al.

(10) Patent No.: US 6,654,130 B2
(45) Date of Patent: Nov. 25, 2003

(54) METHOD AND APPARATUS FOR DETERMINING TEMPERATURE AND TEMPERATURE DISTRIBUTION IN A SLIDER

(75) Inventors: Ruediger Friedrich Berger, Heidesheim (DE); Peter Karl Maechtle, Mainz (DE)

(73) Assignee: International Business Machines Corporation, Armonk, NY (US)

( * ) Notice: Subject to any disclaimer, the term of this patent is extended or adjusted under 35 U.S.C. 154(b) by 53 days.

(21) Appl. No.: 10/034,714

(22) Filed: Dec. 28, 2001

(65) Prior Publication Data

US 2002/0122184 A1 Sep. 5, 2002

(51) Int. Cl.⁷ .......................... G01B 9/02; G01B 11/30; G01B 11/02
(52) U.S. Cl. ........................ 356/516; 356/497; 356/600
(58) Field of Search ................................. 356/516, 511, 356/512, 485, 492, 489, 495, 35.5, 600; 374/130

(56) References Cited

U.S. PATENT DOCUMENTS 6,075,604 A * 6/2000 Crawforth et al. .......... 356/600

* cited by examiner

Primary Examiner—Samuel A. Turner
Assistant Examiner—Patrick Connolly
(74) Attorney, Agent, or Firm—Robert B. Martin; Bracewell & Patterson, L.L.P.

(57) ABSTRACT

A method for in-situ measuring a temperature and/or temperature distribution within a slider due to local heat transfer is provided, whereby the slider is positioned above the surface of a rotating disk, and carries a sensor and/or write element, whereby the rotating disk is moving relatively to the sensor and/or write element, and whereby the shape of said slider is changed locally due to the temperature and/or temperature distribution. By measuring the shape changes of the slider, the temperature and/or temperature distribution can be calculated on the basis of the changes by means of numerical methods. The method may be used as an in-situ measurement in already existing testers, like, e.g., flying height testers. No additional hardware is required and studies of the slider near contact can be performed. In addition, information with respect to the flight height is obtained simultaneously.

14 Claims, 3 Drawing Sheets

METHOD AND APPARATUS FOR DETERMINING TEMPERATURE AND TEMPERATURE DISTRIBUTION IN A SLIDER

BACKGROUND OF THE INVENTION

1. Technical Field

The present invention is generally directed to data or information storage systems where a sensor and/or write element is disposed in proximity to a storage medium which is moving relatively to the sensor and/or write element. More particularly, the invention deals with magnetical or optical storage devices. Still more specifically, the invention relates to a method and apparatus for determining temperature and a temperature distribution in a slider on the storage device.

2. Description of the Related Art

A hard disk drive (HDD) is a digital data storage device that writes and reads data via magnetization changes of a magnetic storage disk along concentric tracks. During operation of the HDD, the magnetic storage disk is rotated at speeds in the order of several thousand revolutions-per-minute (RPM) while digital information is written to or read from its surface by one or more magnetic transducers. To perform an access request, the HDD first positions the sensor and/or write head, also referred to as "read/write head," at the center of the specified data track of the rotating disk.

During operation of the HDD, the read/write head generally rides above the disk surface on a cushion of air, caused by an "air bearing surface", that is created by the movement of the disk under the head. The distance between the read/write head and the disk surface while riding, or partially riding, on the air cushion is referred to as the "flying height" of the head.

Further, the head is carried by a "slider" which is supported by hydrodynamic lift and sink forces. These lift forces are given by the interaction of air streaming underneath the surface structure of the slider. The slider itself is mounted to a flexure (gimbal) which is a part of a suspension well-known in the prior art. The suspension includes a load beam having a mounting region on a proximal end, the flexure on a distal end, a relatively rigid region adjacent to the flexure and a spring region between the mounting region and the rigid region. The mounting region is typically attached to a base plate for mounting the load beam to an actuator. A motor, e.g. a voice coil motor, which is controlled by a servo control system moves the actuator arm to position the read/write head at desired information tracks on the disk.

The performance of the HDD in general depends, to a great extent, on the maintenance of an exact head position versus the disk surface during a reading or writing process. Today, the flying height is as small as 10 nm and is expected to decrease by a factor of two within the next two years. Higher data capacities will lead to read/write heads near contact to the recording medium. Even recording schemes by using contact recording are being considered.

Lowering the flying height improves the performance of the HDD, but partial mechanical contact or friction between the slider and spinning disks, which do not have ideal smooth surfaces, is playing an increasing role in terms of heat generation. While decreasing the flying height, these additional friction forces increase the temperature of the slider as well as that of the rotating medium.

The temperature and temperature distribution in the slider and the read/write head have an influence on HDD performance. First, both the (magnetic) read and write functions of the head and disk have certain temperature-dependent characteristics. Second, the distance of a slider from a spinning disk depends on the ambient temperature. Increasing the ambient temperature increases the temperature of the slider. It has been shown recently that heating the slider body changes the flying height, due to a deformation of the slider influencing the air-bearing surface (cf. P. Mächtle et al.; "Integrated Microheaters for in-situ Flying Height Control of Sliders used in HDDs," Conf. Proceedings MEMS 2001, Interlaken (CH), Jan. 21, –Jan. 25, 2001; to be published).

Thus, a control of the local temperature and the temperature distribution would allow an improvement of the HDD performance. Accordingly, a need exists to determine the temperature and the temperature distribution of a slider and the read/write element.

SUMMARY OF THE INVENTION

It is therefore an object of the present invention to provide a method for determining the temperature and the temperature distribution in a slider.

It is another object of the present invention to provide such a method that can be performed in-situ, i.e., while the slider is positioned over a spinning disk.

It is still another object of the present invention to provide an apparatus that is able to carry out such a determination method.

In one embodiment of the present invention, a measurement of a temperature and/or temperature distribution within a slider due to local heat transfer is provided, whereby the slider is positioned above the surface of a rotating disk, and carries a sensor and/or write element, whereby the rotating disk is moving relatively to the sensor and/or write element, and whereby the shape of said slider is changed locally due to the temperature and/or temperature distribution. By measuring the shape changes of the slider, the temperature and/or temperature distribution can be calculated on the basis of the changes by means of numerical methods. The method may be used as an in-situ measurement in already existing testers, like, e.g., flying height testers. No additional hardware is required and studies of the slider near contact can be performed. In addition, information with respect to the flight height is obtained simultaneously.

These and other objects and advantages are achieved by the method and system disclosed and claimed in the present patent.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

As has been described above, the temperature and the temperature distribution in a slider are important parameters for the performance of hard disk drives.

Figure 1:
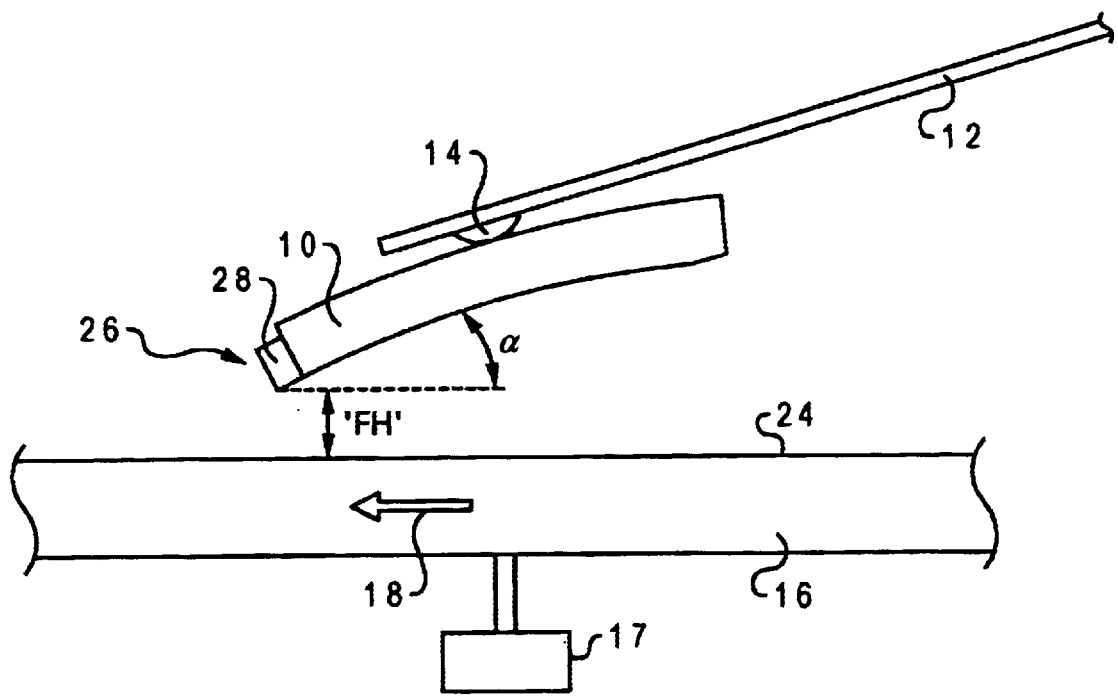
FIG. 1 is a schematic enlarged sectional view of a slider disposed at a flying height above a magnetic disk surface.

A typical design of a slider is shown in FIG. 1. A slider 10 is mounted on a suspension arm 12 by means of glue 14. In this view, a magnetic disk 16 is tangentially rotating or spinning from the right to the left (arrow 18). On the trailing edge 26 of slider 10 a magnetic read/write head 28 is situated.

In this embodiment, slider 10 is not mounted plan-parallel to magnetic disk 16, but with a small tilt angle (or pitch) α in the tangential direction 18 of the spinning magnetic disk 16.

However, it is possible to carry out the present invention in case the angle α is zero, and the slider will thus be arranged parallel to the spinning disk.

When a motor disk drive 17 is turned on, magnetic disk 16 starts spinning and air pressure builds up between slider 10 and magnetic disk 16 such that magnetic read/write head 28 starts flying at a "flying height" (FH). The flying height (FH) in defined herein as a minimum distance between slider 10 and hard disk surface 24.

Note, however, that it is not necessary for carrying out the invention that the slider is flying above the disk. The only prerequisite to generate a temperature variation is that the storage medium, i.e., magnetic disk 16, is moving relatively to magnetic read/write head 28 or an equivalent sensor and/or read/write element.

Figure 2:
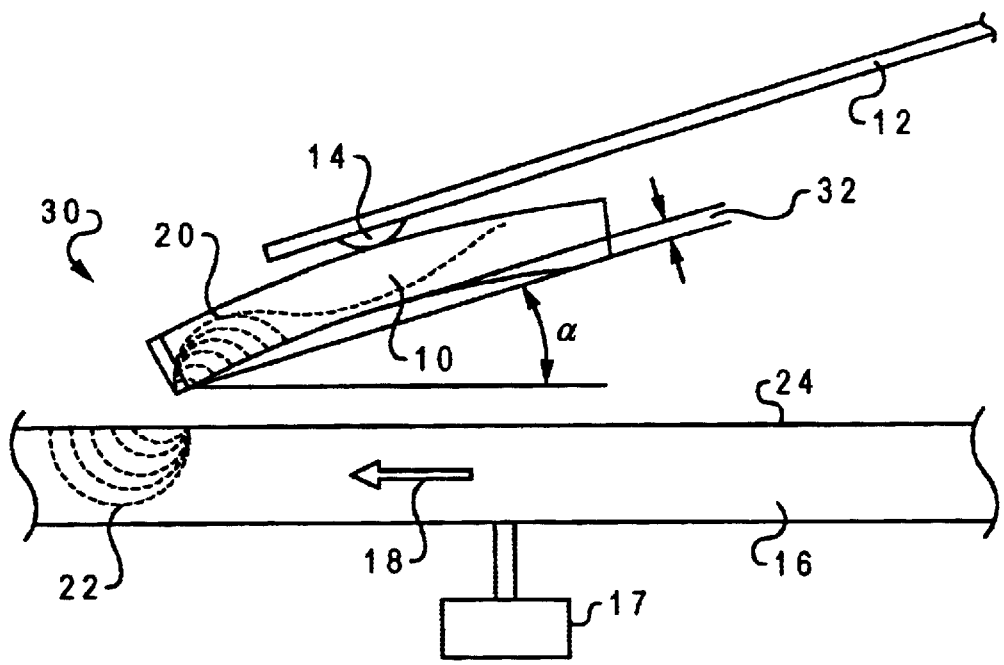
FIG. 2 depicts a head slider assembly at a distance to a hard disk according to the invention, illustrating the temperature distribution as isothermal lines in the slider and the rotating medium.

Referring now to FIG. 2, a view similar to FIG. 1 depicting a head slider assembly 30 having slider 10 located near a hard disk surface 24 is shown in order to illustrate a temperature distribution 20 in slider 10 and a temperature distribution 22 in magnetic disk 16. The spatial orientation and the bending shape of slider 10 relative to the disk surface can be characterized by a pitch angle α, a roll (not shown), a crown value 32, and a camber (not shown). Roll is the rotation about the longitudinal axis of the slider, crown is the bending of slider 10 in a spinning direction, and camber is defined as the bending of slider 10 perpendicular to the spinning direction.

Since, in the embodiment shown in FIG. 2, the slider is mounted at a small pitch angle α in the tangential direction of the spinning disk, the temperature distribution is not homogeneous across the whole slider body, but shows a gradient, whereby the point of slider 10 having the smallest distance from the hard disk surface 24 exhibits the highest temperature. Together with the electrical power of the read and/or write element a complex temperature distribution may occur.

As has already been mentioned, it is also possible to position slider 10 horizontally above the disk. In this position, as well, the temperature distribution is not homogeneous because slider 10 is not completely flat but shows rails or the like extending from the slider body. Thus, even in this position there is the possibility to measure the temperature and a temperature distribution of slider 10.

As has been described before, an increase of temperature will influence the shape of the body of slider 10. Thus, it is possible to determine the temperature distribution in the slider by measuring the local shape changes of slider 10 due to the temperature gradient.

Figure 3A:
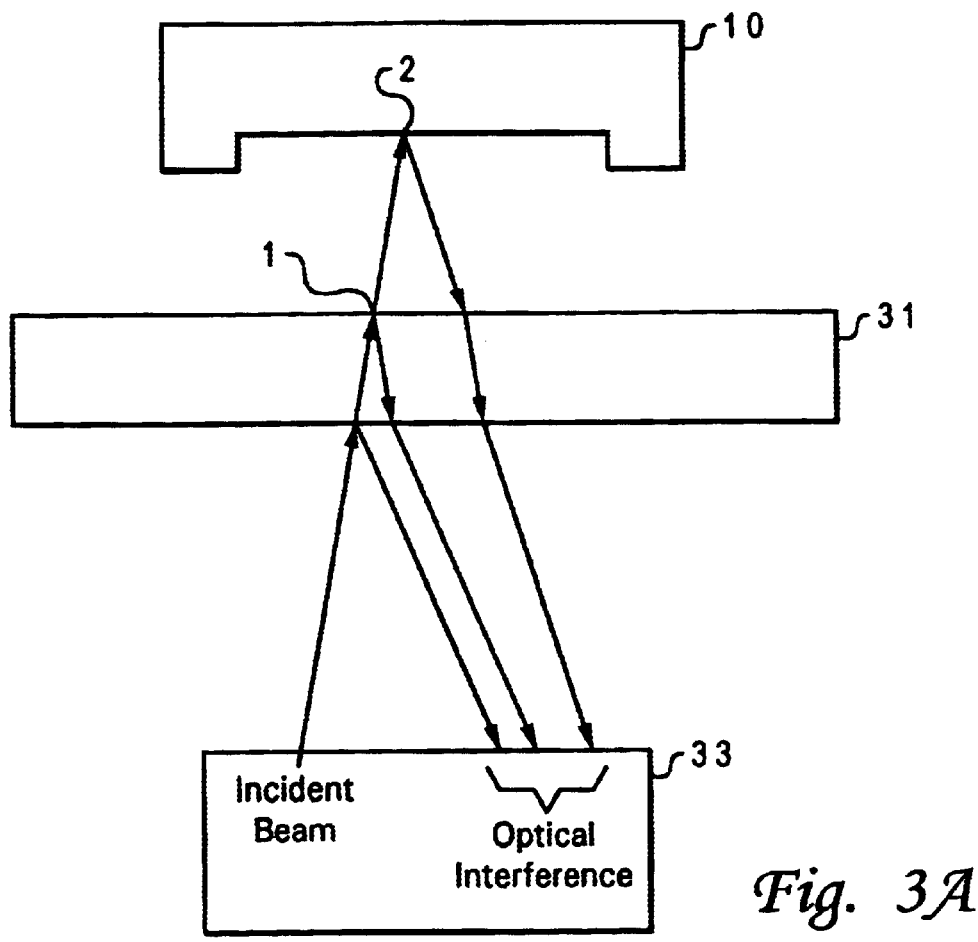
FIGS. 3A and 3B schematically illustrate two apparatuses to carry out the method according to the invention.

Local shape changes can be measured by means of optical surface profilometry. The principle of optical surface profilometry, which is based on white or polychromatic light interference, is schematically shown in FIG. 3A. Upon reflection first from the surface of a spinning magnetic disk, which is a transparent glass-disk, and second from the air bearing surface of slider 10, an optical phase shift occurs between the two light beams that is directly proportional to the height difference between the two illuminated points (1 and 2 in FIG. 3A). This results in multiple beam interference effects. An optical scanner device 33 having a moveable incident beam makes it possible to position the light beam commonly at any location on the slider surface without moving the optical scanner device itself. Therefore an image of the air bearing surface profile is observed.

Figure 3B:
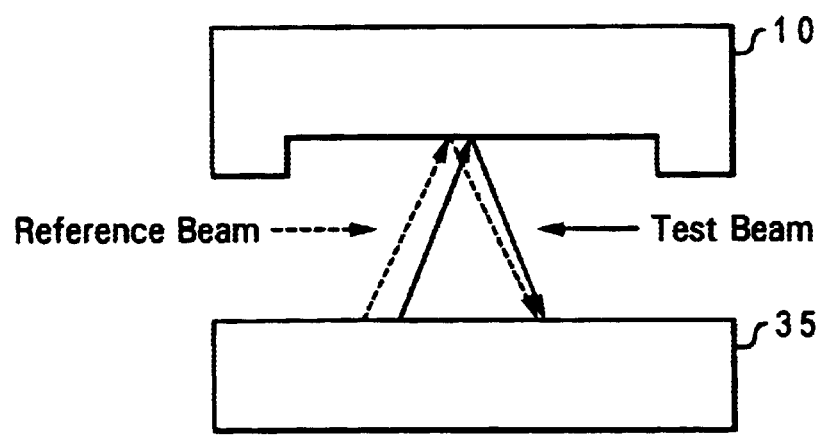

Alternatively, a differential interferometer 35 as shown in FIG. 3B may be used. Here the idea is to measure the wavefront phase corresponding to the relative difference between a test and a reference laser beam. This has the advantage that the spinning disk (either magnetic disk 16 or glass-disk 31) is not needed for measurement. A test and a reference beam are used, both of which are reflected on the surface of slider 10.

However, measurement of local shape changes is not restricted to these techniques. A skilled worker will be able to think of several different methods that will allow to measure the local change in shape of slider 10.

It is also possible to track the local shape changes of the slider body by means of stress and strain sensors using piezoelectric or piezoresistive methods, as readily understood by those skilled in the art.

Figure 4A:
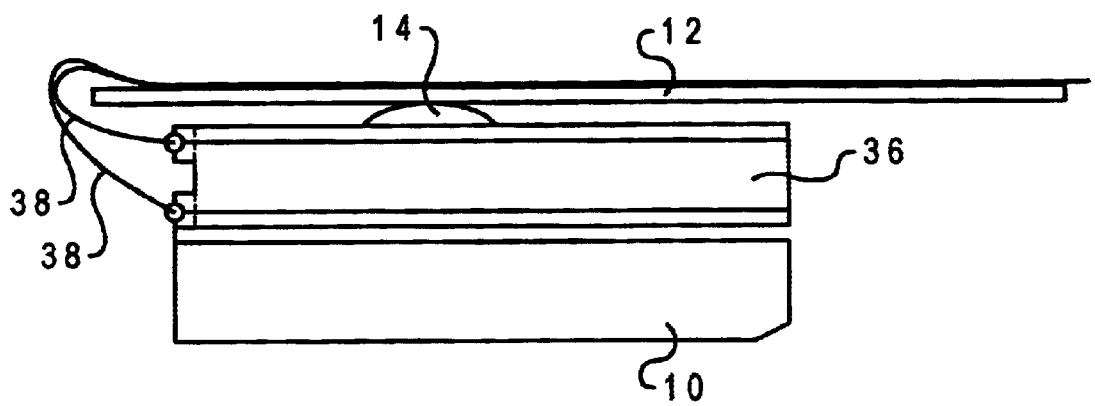
FIGS. 4A and 4B are schematic views of a slider with a piezoelectric layer disposed along the slider plane to carry out the method according to the invention.
Figure 4B:
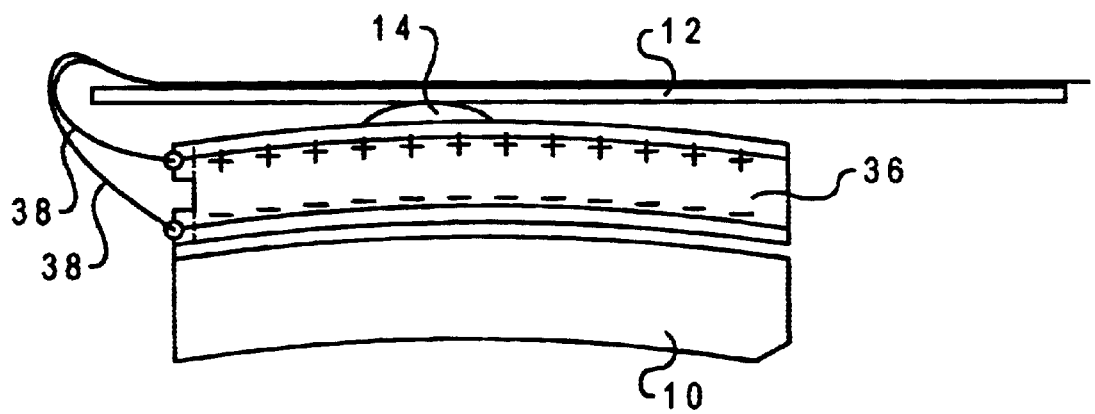

FIGS. 4A and 4B schematically show an alternative embodiment of the present invention using a piezoelectric layer. In addition such a layer can be structured to increase the sensitivity and the local resolution.

Slider 10 is provided with a piezoelectric layer 36, which is arranged along the slider plane. FIG. 4A depicts slider 10 without bending, and FIG. 4B illustrates slider 10 with bending due to heating. Piezoelectric layer 36 is mounted on a suspension arm 12 by glue 14. Piezoelectric layer 36 is electrically connected to a voltmeter (not shown) via electrical wires 38.

In more detail, slider 10 is coated with an insulation layer, a first electrode, a piezoelectric layer and afterwards with a second electrode. The electrodes are electrically connected to the wires 38. Thus, a voltage change will occur upon local shape changes of the slider.

Having thus measured the thermally induced local changes of the slider body, the calculation of the temperature distribution can be carried out by means of numerical methods, e.g., by using finite element analysis.

Finite element analysis is a computerized method widely used in industry to model and solve engineering problems relating to complex systems. A finite element model is generated by reducing the system, or domain, into a number of discretized units typically referred to as finite elements. Once reduced, the domain can be represented by a system of equations that are solved, typically by computer, to predict the response of the domain to various external influences.

An additional temperature source leading to a temperature increase and/or a temperature gradient in the slider is a thermal assisted recording scheme. In such a scheme a local heat source is used to locally modify the (magnetic) parameters of storage media. The heat of those sources has an influence on the temperature and temperature distribution of the slider and storage medium, which can be determined by the technique described. In addition, the efficiency and local temperature or temperature distribution of the temperature assisted recording can be characterized and improved. The temperature of the disk and head can thus be determined.

A further advantage resides in the fact that the inventive method may be used as an in-situ measurement in already existing testers, like, e.g., flying height testers. No additional hardware is required and studies of the slider near or in contact can be performed. In addition, information with respect to the flying height is obtained simultaneously.

The only necessary add-on is a numerical simulation of the shape of the slider as a function of the slider temperature.

It is a further advantage of the present invention that no modification of the slider is necessary to determine the temperature and the temperature distribution.

While the invention has been particularly shown and described with reference to a preferred embodiment, it will be understood by those skilled in the art that various changes in form and detail may be made therein without departing from the spirit and scope of the invention.

What is claimed is:

1. A method for in-situ measurement of a temperature of a slider, the slider being positionable above a surface of a rotatable disk, wherein a shape of the slider is changed due to a change in a slider temperature, said method comprising:

measuring a shape change of the slider; and calculating the slider temperature based on said shape change of the slider.

2. The method according to claim 1, wherein the rotatable disk comprises a magnetic disk.

3. The method according to claim 2, wherein said magnetic disk comprises a glass disk.

4. The method according to claim 3, wherein said measuring comprises measuring by optical surface profilometry.

5. The method according to claim 4, wherein said measuring comprises measuring using a differential interferometer.

6. The method according to claim 1, wherein said measuring comprises positioning a stress/strain sensitive layer on said slider.

7. The method according to claim 6, wherein said positioning of said stress/strain sensitive layer comprises positioning a piezoelectric element.

8. An apparatus for in-situ measurement of a temperature of a slider, the slider being positionable above a surface of a rotatable disk, wherein a shape of the slider is changed due to a change in a slider temperature, said apparatus comprising:

means for measuring a shape change of the slider; and means for calculating the slider temperature based on said shape change of the slider.

9. The apparatus according to claim 8, further comprising the rotatable disk, wherein said rotatable disk comprises a magnetic disk.

10. The apparatus according to claim 8, further comprising the rotatable disk, wherein said magnetic disk comprises a glass disk.

11. The apparatus according to claim 10, wherein said means for measuring comprises means for performing optical surface profilometry.

12. The apparatus according to claim 11, said means for perfomring optical surface profilometry comprising a differential interferometer.

13. The apparatus according to claim 8, said means for measuring said shape change of the slider comprising a stress/strain sensitive layer on the slider.

14. The apparatus according to claim 13, wherein said stress/strain layer comprises a piezoelectric element.

* * * * *